(12) United States Patent
Cooper

(10) Patent No.: US 9,377,559 B2
(45) Date of Patent: Jun. 28, 2016

(54) ACOUSTIC SENSING SYSTEM AND METHOD OF ACOUSTICALLY MONITORING A TOOL

(71) Applicant: Daniel Boyd Cooper, Christiansburg, VA (US)

(72) Inventor: Daniel Boyd Cooper, Christiansburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 325 days.

(21) Appl. No.: 14/028,023

(22) Filed: Sep. 16, 2013

(65) Prior Publication Data
US 2015/0075275 A1    Mar. 19, 2015

(51) Int. Cl.
*G01H 9/00* (2006.01)
*G01V 11/00* (2006.01)

(52) U.S. Cl.
CPC .............. *G01V 11/002* (2013.01); *G01H 9/004* (2013.01)

(58) Field of Classification Search
CPC ... G01V 11/002; G01V 11/001; G01V 1/226; G01V 1/46; G01H 9/004; G01H 9/006; G01D 5/35383; G01D 5/35287; G01D 5/353212; G01D 5/35303
USPC ............... 73/584, 655, 152.58; 356/335, 450, 356/478, 492, 73; 250/227.17, 227.18, 250/227.19, 227.14
See application file for complete search history.

(56) References Cited

U.S. PATENT DOCUMENTS

| | | | |
|---|---|---|---|
| H1436 H | 5/1995 | Kersey et al. | |
| 5,513,913 A | 5/1996 | Ball et al. | |
| 5,754,293 A | 5/1998 | Farhadiroushan | |
| 5,848,204 A | 12/1998 | Wanser | |
| H1813 H | 11/1999 | Kersey | |
| 6,195,462 B1 * | 2/2001 | Bryniarski | G06T 9/00 345/43 |
| 6,274,863 B1 * | 8/2001 | Kersey | G01V 1/16 250/227.14 |
| 6,785,004 B2 | 8/2004 | Kersey et al. | |
| 7,076,122 B2 | 7/2006 | Lee et al. | |
| 7,671,978 B2 | 3/2010 | Clark et al. | |
| 7,920,270 B2 | 4/2011 | Chow et al. | |
| 8,345,258 B2 | 1/2013 | Millerd et al. | |
| 2008/0123467 A1 * | 5/2008 | Ronnekleiv | G01D 5/35383 367/20 |
| 2009/0290147 A1 | 11/2009 | MacDougall et al. | |
| 2010/0085572 A1 | 4/2010 | Hartog | |
| 2010/0321702 A1 | 12/2010 | Froggatt et al. | |

(Continued)

FOREIGN PATENT DOCUMENTS

GB    2259139 A    3/1993

OTHER PUBLICATIONS

Higurashi, E., Sawada, R., "An Integrated Fizeau-Type Interferometric Displacement Sensor for a Feedback-Control Actuation System"; Micro Electro Mechanical System, 2002 the Fiffteenth IEEE International Conference on, Jan. 20-24, 2002, pp. 348-351.

(Continued)

*Primary Examiner* — Helen Kwok
(74) *Attorney, Agent, or Firm* — Cantor Colburn LLP

(57) ABSTRACT

An acoustic sensing system includes, an optical fiber, a plurality of pairs of reflectors distributed along the optical fiber at specific areas where acoustic energy data is sought, a source of coherent radiation in operable communication with the optical fiber, and a detector in operable communication with the optical fiber configured to detect a different wavelength of coherent radiation reflected from each of the plurality of pairs of reflectors including a portion of the coherent radiation reflected from the reflector nearer the detector after having reflected from the reflector further from the detector that define one of the pairs of reflectors.

18 Claims, 1 Drawing Sheet

(56) References Cited

U.S. PATENT DOCUMENTS

| | | |
|---|---|---|
| 2011/0110621 A1 | 5/2011 | Duncan et al. |
| 2011/0122906 A1 | 5/2011 | Seeley et al. |
| 2012/0046866 A1 | 2/2012 | Meyer et al. |
| 2012/0060615 A1* | 3/2012 | Farhadiroushan . G01D 5/35303 73/655 |
| 2012/0227504 A1 | 9/2012 | Goldner et al. |
| 2012/0250017 A1 | 10/2012 | Morys et al. |
| 2013/0021615 A1 | 1/2013 | Duncan et al. |

OTHER PUBLICATIONS

Rao, Y. J., Ran, Z. L., Zhou, C. X., "GFiber-Optic Fabry-Perot Sensors Based on a Combination of Spatial-Frequency-Division Multiplexing and Wavelength Division Multiplexing Formed by Chirped Fiber Bragg Grating Pairs"; Optical Society of America; Applied Optics, vol. 45, Issue 23, Aug. 10, 2006, pp. 5815-5818.

Wyant, C. James, "Computerized Interferometric Surface Measurements"; Optical Society of America; Applied Optics, vol. 52, No. 1, Jan. 1, 2013, pp. 1-8.

Notification of Transmittal of the International Search Report and the Written Opinion of the International Searching Authority; PCT/US2014/050639; Korean Intellectual Property Office; Mailed Nov. 26, 2014; 14 pages.

* cited by examiner

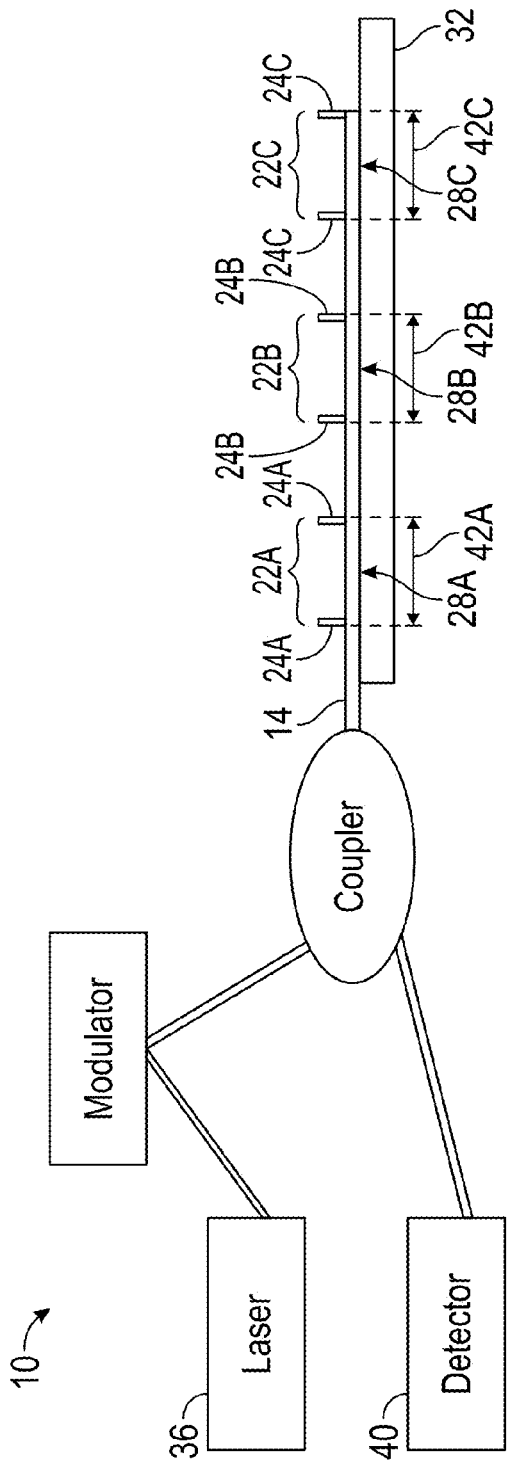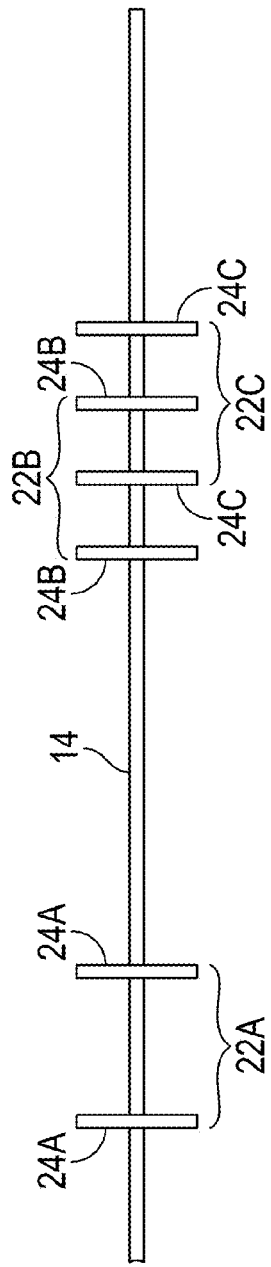

ACOUSTIC SENSING SYSTEM AND METHOD OF ACOUSTICALLY MONITORING A TOOL

BACKGROUND

Systems for monitoring acoustic vibration in a borehole in an earth formation such as in the downhole completion and carbon dioxide sequestration industries have been employed. However, typical systems rely on Rayleigh backscatter. This approach allows for measurements over a very long distance at acceptably high sampling frequencies, which works fine for applications such as leak detection where it is desirable to monitor a long length of an installation. However, the sensitivity of this approach is limited due to the fact that only a very small portion of the transmitted radiation is reflected by Rayleigh backscatter. This makes the approach less desirable in applications where a more sensitive measurement is needed. The industry is receptive to systems and methods that overcome the foregoing limitations while allowing more precise monitoring of a particular component.

BRIEF DESCRIPTION

Disclosed herein is an acoustic sensing system. The system includes, an optical fiber, a plurality of pairs of reflectors distributed along the optical fiber at specific areas where acoustic energy data is sought, a source of coherent radiation in operable communication with the optical fiber, and a detector in operable communication with the optical fiber configured to detect a different wavelength of coherent radiation reflected from each of the plurality of pairs of reflectors including a portion of the coherent radiation reflected from the reflector nearer the detector after having reflected from the reflector further from the detector that define one of the pairs of reflectors.

Further disclosed herein is a method of acoustically monitoring a tool. The method includes, transmitting coherent radiation into an optical fiber attached to the tool, reflecting a first specific wavelength of the coherent radiation off a reflector of a first pair of reflectors nearer to a detector, reflecting the first specific wavelengths of the coherent radiation off a reflector of the first pair of reflectors further from the detector, detecting a portion of the first specific wavelength of the coherent radiation reflected from the reflector of the first pair of reflectors further from the detector, discerning acoustic energy exhibited by the tool at the first pair of reflectors. Still further the method includes, reflecting a second specific wavelength of the coherent radiation off a reflector of a second pair of reflectors nearer to the detector, reflecting the second specific wavelengths of the coherent radiation off a reflector of the second pair of reflectors further from the detector, detecting a portion of the second specific wavelength of the coherent radiation reflected from the reflector of the second pair of reflectors further from the detector, and discerning acoustic energy exhibited by the tool at the second pair of reflectors.

BRIEF DESCRIPTION OF THE DRAWINGS

The following descriptions should not be considered limiting in any way. With reference to the accompanying drawings, like elements are numbered alike:

FIG. 1 depicts a schematic of an acoustic sensing system disclosed herein; and

FIG. 2 depicts a schematic of a portion of an alternate embodiment of an acoustic sensing system disclosed herein.

DETAILED DESCRIPTION

A detailed description of one or more embodiments of the disclosed apparatus and method are presented herein by way of exemplification and not limitation with reference to the Figures.

Referring to FIG. 1, an embodiment of an acoustic sensing system is illustrated at 10. The acoustic sensing system 10 includes an optical fiber 14, a plurality of pairs 22A, 22B, and 22C of reflectors 24A, 24B, and 24C distributed along the optical fiber 14. Although the embodiment illustrated shows three of the pairs 22A, 22B, 22C any number of the pairs 22A, 22B, 22C that are practical can be employed. Each of the pairs 22A, 22B, 22C are positioned at a location 28A, 28B, 28C wherein information about acoustic energy is sought, such as along a tool 32, for example. A source 36 of coherent radiation, such as laser light, for example, is coupled to the optical fiber 14 to allow coherent radiation from the source 36 to be transmitted into the optical fiber 14. A radiation detector 40 is operationally coupled to the optical fiber 14 to monitor coherent radiation received thereby. The two reflectors 24A, 24B, and 24C that define each of the pairs 22A, 22B, and 22C are positioned and configured to reflect radiation therebetween as well as a portion of the reflected radiation back to the detector 40. The portion is transmitted through the reflector 24A, 24B, 24C of each of the pairs 22A, 22B, 22C that is nearer to the detector 40. The portion detected by the detector 40 includes interference fringes relating to changes in dimensions 42A, 42B, 42C between the two reflectors 24S, 24B, 24C that define the pairs 22A, 22B, 22C. Changes in the dimensions 42A, 42B, 42C over time can be attributed to acoustic energy exhibited at the location 28A, 28B, 28C under observation. The system 10 is therefore able to discern acoustic energy exhibited by separate portions of the tool 32.

Both the source 36 and the detector 40 are tunable to specific wavelengths (or frequencies) of the coherent radiation. In fact, both the source 36 and the detector 40 are able to transmit and receive multiple wavelengths of radiation based on wavelength division multiplexed technology. Since the reflectors 24A, 24B, 24C in this embodiment are Fiber Bragg Gratings (although it should be noted that other embodiments can employ broadband reflectors instead of the Fiber Bragg Gratings), each of the pairs 22A, 22B, 22C is set to reflect radiation of a specific wavelength or band of wavelengths. Thus, the source 36, optical fiber, 14, the detector 40 and each of the pairs 22A, 22B, 22C together function as a Fizeau Interferometer. Each of the Fizeau Interferometers is capable of monitoring the dimensions 42A, 42B, 42C (between the two reflectors 24A, 24B, 24C that make up each of the pairs of reflectors 22A, 22B, 22C) by employing various wavelengths of radiation being transmitted by the source 36 and received by the detector 40. Such monitoring over time allows for analysis of movement between the reflectors 24A, 24B, 24C, such as movement due to acoustic energy or vibration.

Attaching one of the pairs 22A, 22B, 22C to a tool 32 allows an operator to determine acoustic energy being exhibited in the tool 32, or even just within a portion of the tool 32. In industries such as the hydrocarbon recovery or carbon dioxide sequestration, for example, an operator can determine health and operational characteristics about the tool 32, be it an electronic submersible pump, a mud motor, or other downhole tool, or just a section of one such tool 32 while the downhole tool is operating in an earth formation borehole. The two reflectors 24A, 24B, 24C, in the pairs 22A, 22B, 22C may be on average about ¼ to 2 meters apart and more specifically about 1 meter apart. For portions of interest of the tool 32 that are nearer to one another than 1 meter, one of the reflectors 24B in one of the pairs 22B can be positioned between the two reflectors 24C in one of the other pairs 22C as is illustrated in FIG. 2 so as to gain increased spatial resolution in the measurements.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An acoustic sensing system comprising:
    an optical fiber;
    at least one pair of reflectors including a first detector and a second detector distributed along the optical fiber at specific areas where acoustic energy data is sought;
    a source of coherent radiation in operable communication with the optical fiber; and
    a detector in operable communication with the optical fiber configured to detect a wavelength of coherent radiation reflected from each of the first and second reflectors including a portion of the wavelength of coherent radiation reflected from the one of the first and second reflectors arranged nearer the detector and a portion of the wavelength of coherent radiation reflected from the other of the first and second reflectors arranged reflector further from the detector, wherein the acoustic sensing system determines a change in distance between the first reflector and the second reflector caused by acoustic energy based on differences in the wavelength of coherent radiation reflected from each of the first and second reflectors.

2. The acoustic sensing system of claim 1, wherein the acoustic sensing system is a wavelength division multiplexed measuring device.

3. The acoustic sensing system of claim 1, wherein the at least one pair of reflectors forms a part of a Fizeau interferometer.

4. The acoustic sensing system of claim 1, wherein the at least one pair of reflector is attached to a downhole tool for which acoustic energy information is sought.

5. The acoustic sensing system of claim 1, wherein each of the first and second reflectors are Fiber Bragg Gratings.

6. The acoustic sensing system of claim 1, wherein the at least one pair of reflectors is attached to a specific portion of interest of one or more downhole tools.

7. The acoustic sensing system of claim 6, wherein the one or more downhole tools is a mud motor or a pump.

8. The acoustic sensing system of claim 1, wherein the first reflector is separated by a dimension of between about ¼ to about 2 meters from the second reflector.

9. The acoustic sensing system of claim 1, wherein the at least one pair of reflectors includes a first pair of reflectors and a second pair of reflectors, one of the first and second reflectors of the first pair of the plurality of pairs of reflectors is positioned between reflectors that form the second pair of reflectors.

10. The acoustic sensing system of claim 9, wherein an acoustic energy encountered by the first pair of reflectors is separately detectable from an acoustic energy encountered by the second pair of reflectors.

11. The acoustic sensing system of claim 1, wherein the source of coherent radiation is a laser.

12. The acoustic sensing system of claim 1, wherein the coherent radiation is light.

13. A method of acoustically monitoring a tool, comprising:
    transmitting a coherent radiation into an optical fiber attached to the tool;
    reflecting a specific wavelength of the coherent radiation off a first reflector optically associated with the optical fiber;
    receiving a first portion of the specific wavelength reflected by the first reflector at a detector;
    reflecting the specific wavelength of the coherent radiation off a second reflector optically associated with the optic fiber, the second reflector being spaced further from the detector than the first reflector;
    receiving a second portion of the specific wavelength reflected by the second reflector at the detector; and
    discerning an acoustic energy exhibited by the tool based on a change in distance between the first and second reflectors as determined by a difference between the first portion of the specific wavelength and the second portion of the specific wavelength.

14. The method of acoustically monitoring a tool of claim 13, further comprising, transmitting laser light into the optical fiber.

15. The method of acoustically monitoring a tool of claim 13, further comprising, wavelength division multiplexing the coherent radiation transmitted into the optical fiber.

16. The method of acoustically monitoring a tool of claim 15, wherein the wavelength division multiplexing employs at least one of optical frequency
    domain reflectometry and optical time domain reflectometry.

17. The method of acoustically monitoring a tool of claim 13, wherein the first and second reflectors are Fiber Bragg Gratings.

18. The method of acoustically monitoring a tool of claim 13, wherein the acoustic energy discerned is due to operation of a downhole tool positioned in an earth formation borehole.

* * * * *